Dec. 29, 1959  R. W. FREEMAN  2,918,819
RESET MECHANISM FOR DIAL INDICATOR
Filed June 6, 1955
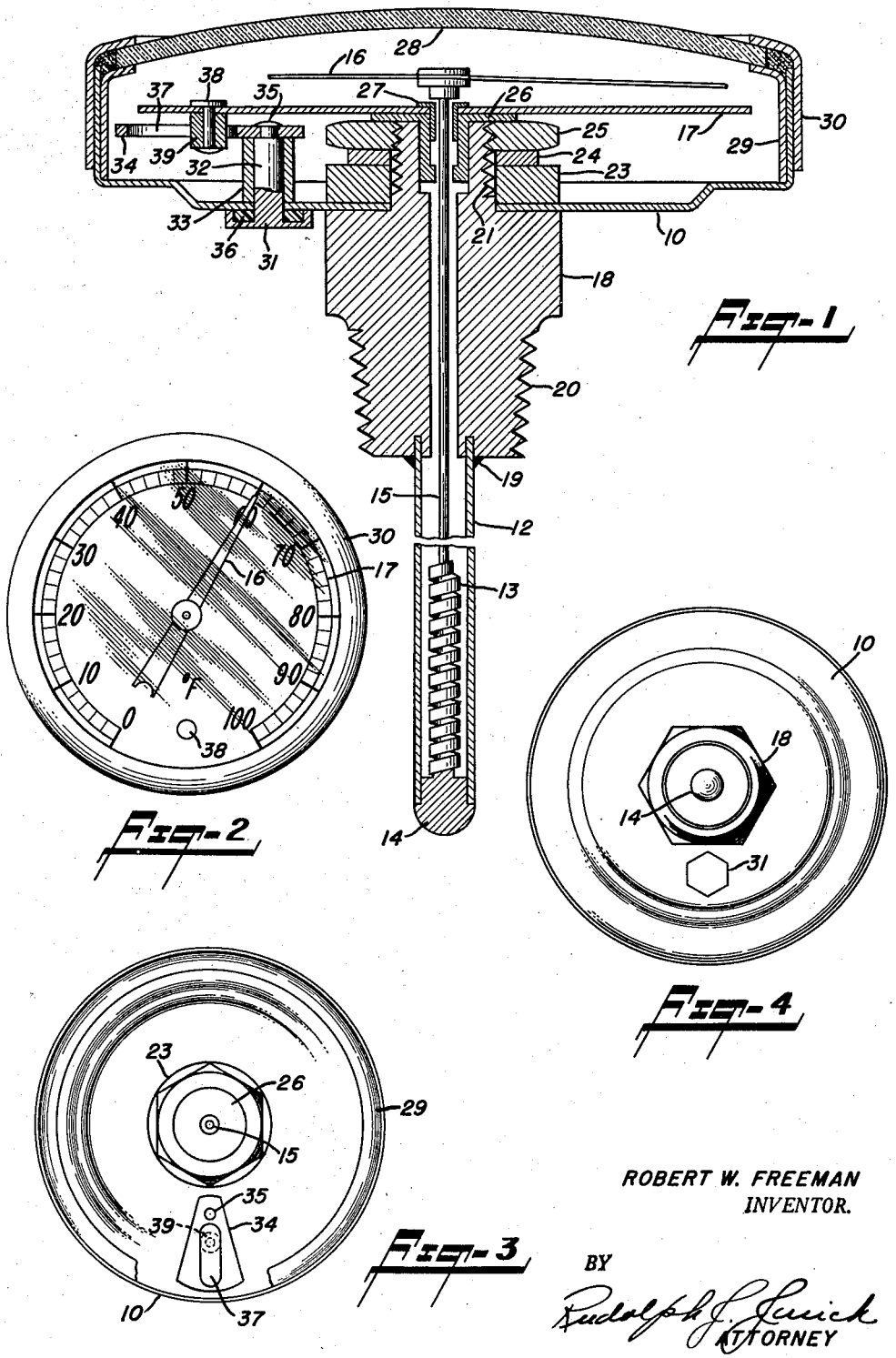
ROBERT W. FREEMAN
INVENTOR.

United States Patent Office 2,918,819
Patented Dec. 29, 1959

2,918,819

RESET MECHANISM FOR DIAL INDICATOR

Robert W. Freeman, East Orange, N.J., assignor, by mesne assignments, to Daystrom, Incorporated, Murray Hill, N.J., a corporation of New Jersey Application June 6, 1955, Serial No. 513,427

6 Claims. (Cl. 73—363.7)

This invention relates to bimetallic thermometers of the type comprising a pointer rotatable relative to a calibrated scale and more particularly to a device of this type provided with means operable externally of the case to rotatably displace the scale relative to the pointer.

The temperature-sensitive element of a thermometer usually is a thin ribbon of bimetal wound in the form of a helical coil of one or more layers. In order to provide a thermometer having a relatively high speed of response to temperature changes and a substantial angular pointer deflection per unit change in temperature, the helical element is rather long and delicate. Consequently, such thermometer may accidentally go off calibration due to dropping, vibration or other unusually severe shock. In such case, it has heretofore been necessary to return the thermometer to the manufacturer for re-standardizing, an operation requiring at least a partial disassembly of the instrument.

An object of this invention is the provision of a gauge, such as a bimetallic thermometer, provided with means operable externally of the instrument for resetting the scale relative to the pointer in the event the instrument has gone off calibration due to vibration, shock, etc.

An object of this invention is the provision of a bimetallic thermometer having a pointer movable relative to a calibrated scale and including means operable externally of the device to rotate the scale a predetermined extent relative to the pointer.

An object of this invention is to provide a reset device of the character set forth, consisting of a hexagonally headed or slotted part with a shaft, said shaft passing through the back of the case and a bushing, which bushing properly spaces a fan-shaped part staked to the end of the shaft, the head of the reset part being sealed against leaking by means of a silicone rubber ring or the like between it and the back of the case, the fan-shaped part having a slot through which a pin riveted to the scale passes, said scale being pivoted with respect to its case so that when the headed or slotted part is rotated, it causes the fan-shaped part to swing in an arc, causing the scale to rotate a desired amount to place it in proper calibration.

These and other objects and advantages will become apparent from the following detailed description, when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

Figure 1 is a longitudinal sectional view of a bimetallic thermometer embodying my invention;

Figure 2 is a top plan of the thermometer;

Figure 3 is similar to Figure 2 but with the scale plate removed to show the resetting mechanism; and Figure 4 is a bottom plan view of the thermometer.

Referring now to the drawings, there is shown an indicating gauge in the form of a thermometer having a sheet metal case 10, forming a scale chamber, with a tubular stem or shell 12 in which an operating element such as a thermally-responsive bimetallic coil 13 is mounted. As shown, one end of the bimetallic coil is firmly secured to a plug 14 in any suitable manner such as soldering, welding or the like, said plug being soldered or otherwise fastened to the shell to close the end thereof. The other end of the coil is similarly secured to a staff or shaft 15 carrying an indicating pointer 16 on the opposite end for movement over a calibrated scale carried by the plate 17 and both enclosed in the generally flat case 10. The shell 12 has its case adjacent end secured to a hub 18, as by welding or brazing, indicated at 19. The hub may be externally threaded, as indicated at 20, and also has a threaded portion 21 projecting through the bottom or back wall of the casing 10. Surrounding this extension 21 is a spacer 23 to which is applied a lock washer 24 upon which sets a desirably hexagonal nut 25, threaded to said extension to secure the hub 18 and its stem 12 to the back wall of the case 10.

The scale plate 17 is frictionally secured to the extension 21 between a flanged lower or back bushing 26, frictionally held in a socket in the extension 21, and a flanged upper or front bushing 27. The bushing 26 is apertured to frictionally receive the body of the bushing 27, the latter being apertured to freely receive the shaft 15. It will be seen that while the scale plate 17 normally is frictionally secured in relatively fixed position between the cooperating flanges of the bushings 26 and 27 it may be rotated upon the application of a rotating force of sufficient magnitude to overcome the friction between the contacting surfaces of the bushings and the scale plate. After assembly, the case 10 is closed by a transparent cover 28 secured to the case in any desired manner such as, for example, by the bezel 29 and the clamping ring 30.

The adjusting device or means to externally rotate the scale plate 17 if it accidentally for any reason goes off calibration, consists of a reset part 31 with a tool-engageable end portion disposed externally of the case. This end portion may be hexagonally or non-circularly headed to receive a resetting wrench, or with its outer end or head slotted to receive a resetting screwdriver, or both. This device has a shaft or stem 32 which passes through the back of the case 10 and an associated bushing 33. The bushing 33 serves to space a plate 34, desirably fan or nearly sector shaped in plan and staked to the end of the shaft as indicated at 35. The head or turnable exterior portion of the part 31 of the reset is desirably sealed against leakage by means of a washer preferably formed as a silicone rubber ring 36 disposed between it and the back of the case.

The fan-shaped part 34 is provided with a slot or notch 37 offset from its axis and the scale plate 17 has a pin 38 desirably riveted thereto and desirably provided with a roller or bushing 39. This pin 38 and its roller or bushing are circumscribed by the part 34 by being received in the slot 37. When the part 31 is rotated, as by a wrench or screwdriver, the fan-shaped part 34 is caused to swing in an arc, thereby correspondingly rotating the scale plate 17.

In a practical embodiment of the invention, the relationship of the slot 37 in the fan-shaped part 34 and the position for reception of the pin 38 therein is such that the scale plate may be rotated approximately 70 mechanical degrees, which is sufficient for any normal adjustment. It will be understood that the driver-follower relationship of the parts 34 and 17 may be modified by substituting another suitable connection or cooperation, an example being a transposition of the slot and pin. The part 34 is desirably fan-shaped in order to limit its movement by acting as a stop. That is, its edge at the limit of desired motion engages the nut 25, so that the scale pin 38 is not sheared off in use. The scale plate 17, being mounted between two bushings, can rotate about its center due to rotary movement of the reset device but is held secure with enough friction to eliminate any undesired movement.

Having now described my invention in accordance with the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

I claim:
1. A reset device for a thermometer of the type having a tubular stem with a closed lower end, a scale chamber with which its upper end communicates, means securing said stem to said chamber, a scale plate within the scale chamber, said scale plate being rotatable in said chamber; said reset device for adjusting the position of said scale plate in said chamber comprising a manually-rotatable member with a turnable portion outside the scale chamber and another portion passing through the back of said case, a plate member having a slot therein and secured to said rotatable member, said slot being offset from the axis of said rotatable member and a pin carried by said scale plate and received in said slot whereby, when the manually-rotatable member is turned, it causes the plate member to swing in an arc to correspondingly move the scale plate to effect the desired adjustment thereof.

2. The invention as recited in claim 1, including stop means limiting the angular rotation of said rotatable member.

3. The invention as recited in claim 2, wherein the stop means comprises the means securing the stem to the chamber, and said plate member is oriented with respect to the securing means so that opposite edges of the plate member strike the said means upon a predetermined rotation of the rotatable member in one direction or the other.

4. A reset device for a thermometer of the type having a tubular stem, operating means within said stem, a closed lower end and a scale chamber with which its upper end communicates, a scale plate within the scale chamber, said scale plate being rotatable in said chamber; said reset device for adjusting the position of said scale plate in said chamber comprising adjusting means passing through the back of the case, a part secured to the inner end of said adjusting means, said adjusting means having a tool-engageable end portion on the outside of said scale chamber, and a part of said scale plate circumscribed by an axially offset portion of the part secured to the inner end of said adjusting means whereby, when the tool-engageable portion is moved, it moves the scale plate to effect a desired adjustment thereof, the circumscribed part of the scale plate comprising a pin, and means forming a pin-receiving slot in the offset portion.

5. A reset device for a thermometer of the type having a tubular stem, a closed lower end and a scale chamber with which its upper end communicates, a scale plate within the scale chamber, said scale plate being rotatable in said chamber; said reset device for adjusting the position of said scale plate in said chamber comprising a headed part with shaft passing through the back of the case, a bushing on said shaft, a fan-shaped part staked to the end of said shaft and spaced from the back of said scale chamber by said bushing, the head portion of said headed part on the outside of said scale chamber being turnable and carrying sealing means for preventing leakage into said chamber, said fan-shaped part being provided with a slot, and a pin carried by said scale plate and received in said slot whereby, when the headed part is turned, it causes the fan-shaped part to swing in an arc to correspondingly move the scale plate to effect a desired adjustment thereof.

6. A reset device for a thermometer of the type having a tubular stem, a closed lower end and a scale chamber with which its upper end communicates, a scale plate within the scale chamber, said scale plate being rotatable in said chamber; said reset device for adjusting the position of said scale plate in said chamber comprising a shaft passing through the back of the case, a slotted part secured to the end of said shaft, a head for said shaft disposed on the outside of said case and adapted to be turned, a pin carried by said scale plate and received in said slotted part, a tubular stem extending from said case, and an interior nut securing said stem to the case, whereby when the head is turned, it causes the slotted part to swing in an arc limited by engagement with said nut, to correspondingly move the scale plate and effect a desired adjustment thereof, while avoiding breakage of the pin.

References Cited in the file of this patent

UNITED STATES PATENTS

| 2,541,174 | Neustrand | Feb. 12, 1951 |
| 2,608,947 | Ames | Sept. 2, 1952 |

FOREIGN PATENTS

| 607,685 | France | Apr. 3, 1926 |
| 234,148 | Switzerland | Jan. 3, 1945 |